United States Patent
Ho et al.

(10) Patent No.: US 7,096,105 B2
(45) Date of Patent: Aug. 22, 2006

(54) COMBINE HAVING A SYSTEM ESTIMATOR TO AUTOMATICALLY ESTIMATE AND DYNAMICALLY CHANGE A TARGET CONTROL PARAMETER IN A CONTROL ALGORITHM

(75) Inventors: Yun-Ren Ho, Naperville, IL (US); John E. Bundy, Racine, WI (US); John G. Brome, Delavan, WI (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/969,398

(22) Filed: Oct. 20, 2004

(65) Prior Publication Data

US 2005/0085282 A1    Apr. 21, 2005

Related U.S. Application Data

(62) Division of application No. 10/167,310, filed on Jun. 11, 2002.

(51) Int. Cl.
  *F16H 47/00*    (2006.01)
  *F16H 35/02*    (2006.01)
(52) U.S. Cl. ............................ 701/50; 701/68; 475/276
(58) Field of Classification Search ................ 701/50, 701/68, 67, 99; 475/276, 277; 123/561, 123/339.1; 322/16; 477/149, 155
See application file for complete search history.

(56) References Cited

U.S. PATENT DOCUMENTS

| | | | | |
|---|---|---|---|---|
| 4,008,628 A | * | 2/1977 | Orshansky, Jr. | ............. 475/81 |
| 4,821,190 A | * | 4/1989 | Patil | ........................... 701/68 |
| 5,818,116 A | * | 10/1998 | Nakae et al. | ............. 290/38 R |
| 5,820,508 A | | 10/1998 | Konig et al. | |
| 5,890,468 A | * | 4/1999 | Ozawa | ....................... 123/561 |
| 5,983,151 A | | 11/1999 | Okada et al. | |
| 6,036,597 A | | 3/2000 | Arner | |
| 6,054,776 A | * | 4/2000 | Sumi | .......................... 290/17 |
| 6,059,656 A | | 5/2000 | Satzler | |
| 6,213,870 B1 | | 4/2001 | Satzler | |
| 6,226,582 B1 | | 5/2001 | Adsett et al. | |
| 6,247,295 B1 | * | 6/2001 | Hansen et al. | .......... 56/10.2 A |
| 6,359,403 B1 | | 3/2002 | Pollklas et al. | |
| 6,723,018 B1 | * | 4/2004 | Hayabuchi et al. | ......... 475/276 |

OTHER PUBLICATIONS

U.S. Appl. No. 10/167,310, filed Jun. 11, 2002, Ho et al.

* cited by examiner

*Primary Examiner*—Dalena Tran
(74) *Attorney, Agent, or Firm*—Michael G. Harms; John William Stader; Stephen A. Bucchianeri

(57) ABSTRACT

An agricultural combine includes a rotor drive system to which sensors are coupled to signal the rotational speed of a hydraulic motor and an engine. An electronic controller that contains a mathematical model of the system reads the sensors and using the model estimates additional parameters of the system. The estimated parameters include a gearbox's gear ratio and a planetary ring gear's speed. These estimated parameters and the sensor readings are used in a PID feedback control loop to control the speed of a planetary ring gear by controlling the speed of a hydraulic motor driving the sun gear. In this manner, the controller can drive the ring gear to a predetermined speed that reduces the difference in the input and output speeds of a hydraulic clutch and thereby engage that clutch while reducing shock to the clutch and other mechanical components of the combine.

7 Claims, 4 Drawing Sheets

COMBINE HAVING A SYSTEM ESTIMATOR TO AUTOMATICALLY ESTIMATE AND DYNAMICALLY CHANGE A TARGET CONTROL PARAMETER IN A CONTROL ALGORITHM

CROSS REFERENCE TO RELATED APPLICATIONS

This Patent Application is a Divisional of, and claims priority to, co-pending U.S. patent application Ser. No. 10/167,310, filed on Jun. 11, 2002 titled, "A Combine Having a System Estimator to Automatically Estimate and Dynamically Change a Target Control Parameter in a Control Algorithm" and having Yun-Ren Ho, John E. Bundy, and John G. Brome as the Inventors.

FIELD OF THE INVENTION

The invention relates to agricultural combines and systems for controlling their operation. More particularly, it relates to control systems for the operation of combine rotors. Even more particularly, it relates to the monitoring and control of hydro-mechanical drives for combine rotors.

BACKGROUND OF THE INVENTION

Hydro-mechanical drive systems for combine rotors monitor a variety of system parameters when controlling the engagement, disengagement and speed of combine rotors. They typically have a variety of sensors responsive to pressures, speeds and positions of the various components comprising the systems.

Normally, system parameters, which are necessary for the control algorithms and the display of data to the operator, are measured directly by using sensors. For example, a sensor may directly indicate the gear ratio or range of the drive system's transmission. Other sensors may measure system hydraulic pressure, rotor speed, shaft speed, and other parameters.

Because of the limitations of these sensors, such as high cost, large size, and unreliability, it would be beneficial to eliminate one or more sensors to reduce the cost, reduce the size, and increase the reliability of the combine and its control systems.

The present invention provides a means to obtain the desired system parameters without the cost of the additional sensors, and in certain cases, obtain values for physical parameters that cannot otherwise be measured.

Since processing capability has increased tremendously in recent years, a micro-controller can run a system model (models, or equation(s)), called a system estimator, in real time along with the conventional control algorithms. The system estimator can combine one or more sensor values with a system model to estimate an operational parameter of the combine that would otherwise require a separate sensor, or would otherwise be immeasurable.

These estimated parameters can be used merely as information to the operator, such as by displaying them to the operator, or can be used to control various vehicle operations.

Although applicable to any system that can be modeled, a particular embodiment of a system estimator with applicability to a hydro-mechanical drive system on a combine is disclosed.

SUMMARY OF THE INVENTION

In accordance with a first aspect of the invention a combine is provided, including a chassis on which an engine and a drive system are mounted. An electronic controller with at least one sensor monitors a physical parameter of the drive system, applies that measured parameter value to a mathematical model of the drive system, which provides another estimated parameter of the drive system. This parameter is used to generate a target value that is used as a system input to a control algorithm to regulate the dynamic system. The estimator operates in real time, continually estimating the second parameter, revising the target value and using the target value in the control loop.

In accordance with a second aspect of the invention, a system estimator for a work vehicle is provided, the work vehicle having a dynamic system that is capable of being modeled in terms of at least one measurable physical parameter and a second physical parameter, said second parameter being indicative of an operating condition of the dynamic system, the system estimator including an electronic controller having a digital microprocessor and an electronic digital memory, the memory including a sequence of preprogrammed instructions including a model of the dynamic system expressed at least in terms of the at least one measurable parameter; and at least one sensor coupled to the dynamic system and the electronic controller to generate a first signal indicative of the at least one measurable parameter and to provide the first signal to the electronic controller, wherein the electronic controller is configured to receive the first signal, apply it to the model of the dynamic system and estimate a value of the second parameter. This estimated value is used to generate a target value that, in turn, is used as a system input to a control algorithm to regulate the dynamic system. The estimator operates in real time, continually estimating the second parameter, revising the target value and using the target value in the control loop.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
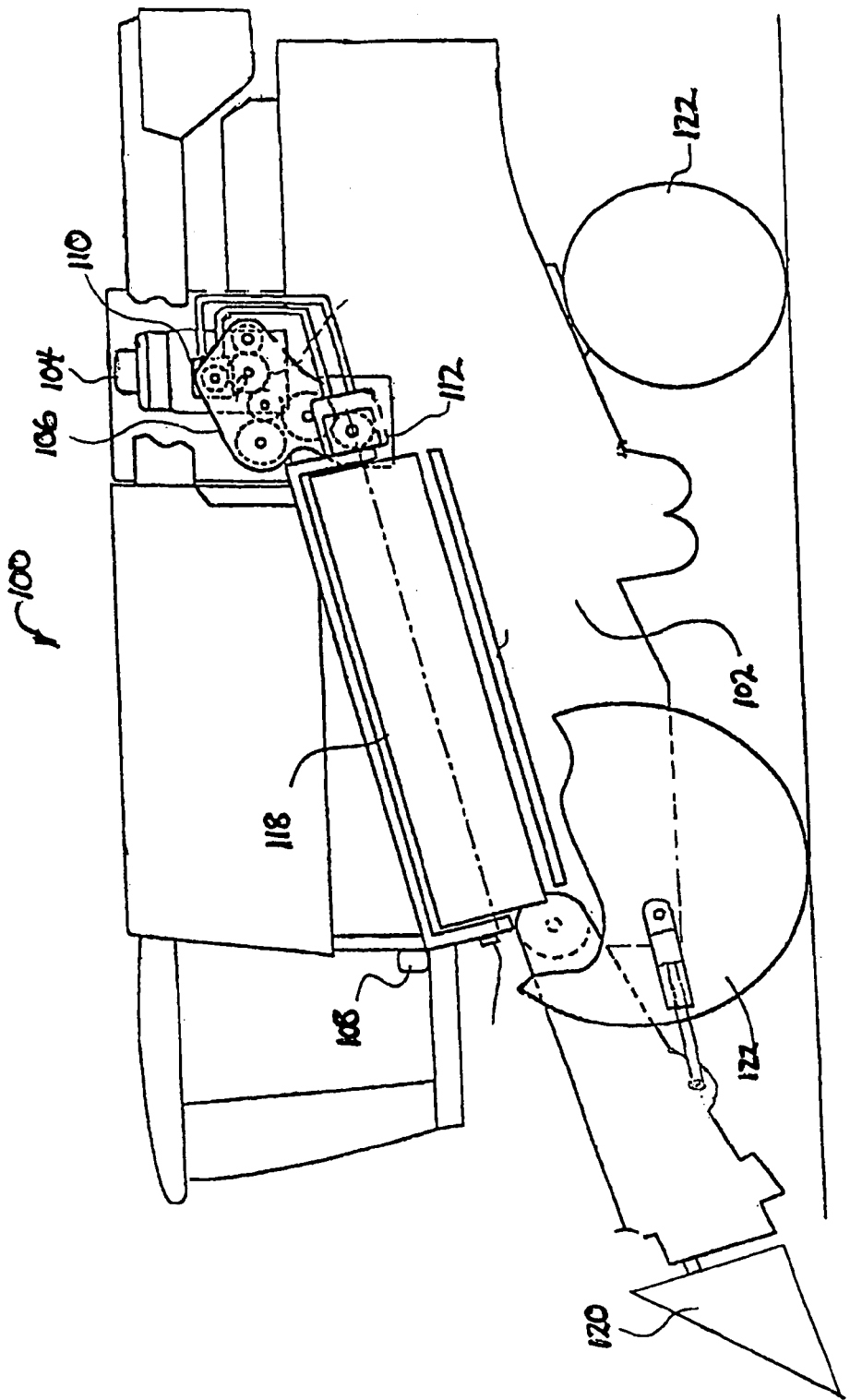
FIG. 1 is a side schematic view of an agricultural combine having a hydraulic drive system with parameters estimated by the present invention.

Referring to FIG. 1, a work vehicle is illustrated, here shown as an agricultural combine 100. The work vehicle has a chassis 102 on which an engine 104 is mounted. A drive system 106 is coupled to and driven by engine 104 to rotate rotor 118. An electronic control system 108 is coupled to the engine and the drive system to monitor various sensors, to control the engine and to control the drive system.

The engine 104 is preferably an internal combustion engine, such as a multi-cylinder gasoline or diesel engine.

The drive system 106 includes a hydraulic pump 110 that is coupled to and driven by the engine, a hydraulic motor 112 that is fluidly coupled to and driven by pump 110, a gear train coupling engine 104 to the pump, a gear train coupling engine 104 to a planetary gear arrangement, the planetary gear arrangement 114 (FIG. 2) itself, and a gearbox 116 (FIG. 2) that drives the combine rotor 118.

Rotor 118 rotates with respect to chassis 102 and threshes agricultural material, such as corn or wheat. A header 120 is coupled to the front of the combine chassis to gather the agricultural material from the field and direct it into the rotor. The agricultural material is gathered by the headers and cut. Once cut it falls into a header trough that includes an auger. The auger drives the agricultural material toward the mouth of the rotor via the feeder 124, which receives and threshes it.

A plurality of wheels 122 are coupled to the chassis to engage the ground and support the combine as it travels over the ground. One or more hydraulic motors (not shown) may be coupled to the wheels to drive the wheels in rotation, thereby driving the combine over the ground.

Figure 2:
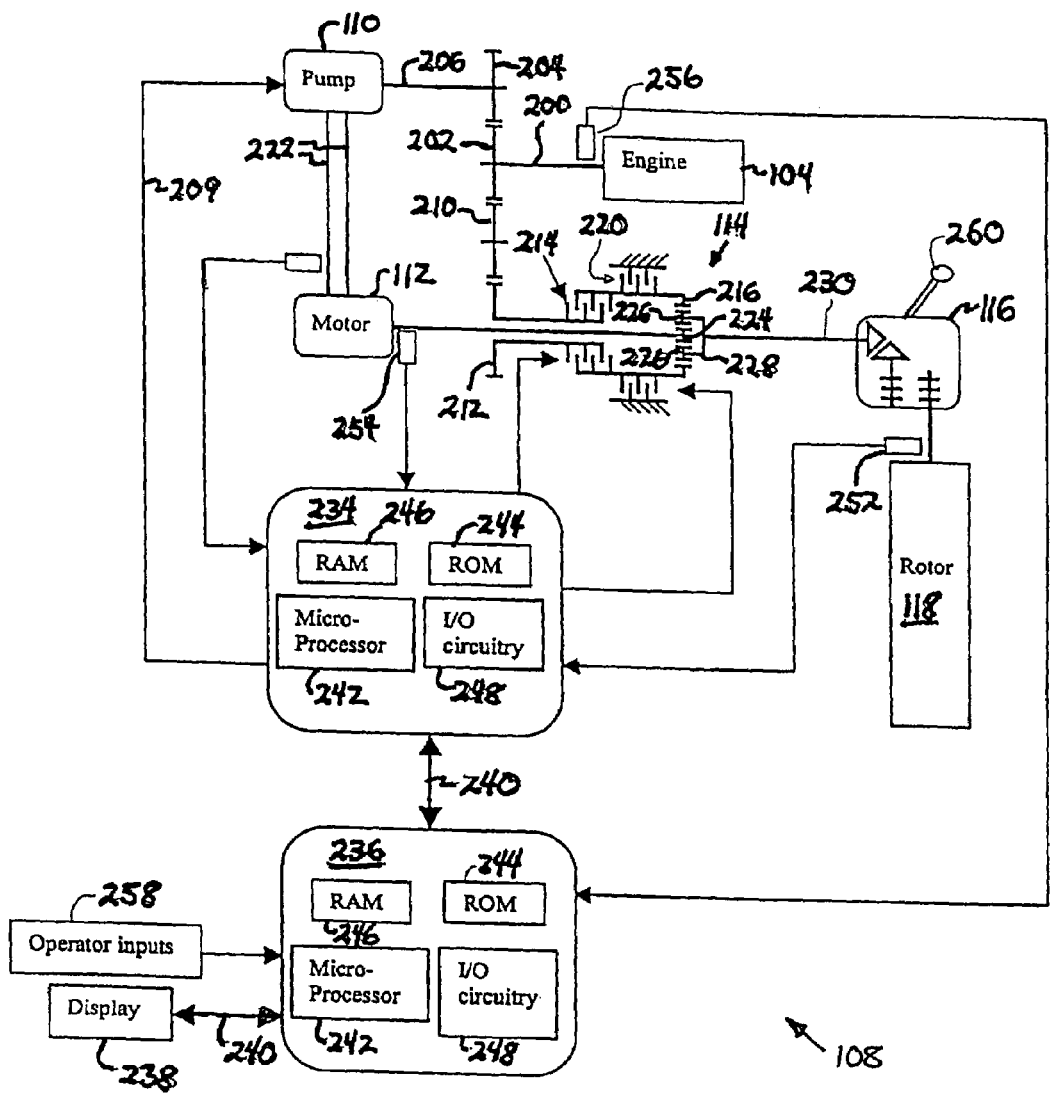
FIG. 2 is an electrical, hydraulic and mechanical schematic diagram of the drive system of the combine of FIG. 1.

FIG. 2 illustrates construction details of the work vehicle (and particularly the drive system) in a schematic form. Engine 104 has an output shaft 200 to which spur gear 202 is fixed. Gear 202 drives spur gear 204. Spur gear 204 is fixed to shaft 206, which is the input shaft to hydraulic pump 110.

Hydraulic pump 110 is a variable displacement pump in which the specific output can be varied under computer control. In particular, pump 110 has internal electronic actuators that vary the specific displacement of the pump in response to an electrical signal. Controller 234 applies the signal to pump 110 over electrical control lines 209.

Gear 202 also meshes with and drives spur gear 210, which is coupled to and drives the auger and header (not shown). Spur gear 210, in turn, meshes with and drives spur gear 212. Spur gear 212, in turn, is coupled to and drives the input shaft of engine-to-ring clutch 214.

Engine-to-ring clutch 214 is a hydraulically actuated multi-plate clutch that couples gear 212 (and hence engine 104) to ring gear 216 of planetary gear arrangement 114. When clutch 214 is engaged, engine 104 is coupled to and drives ring gear 216. When clutch 214 is disengaged, engine 104 is disconnected from ring gear 216.

A second clutch 220 (a ring-to-frame clutch) is coupled to and between ring gear 216 and the frame or chassis 102 (indicated by the ground symbol) to fix the ring gear with respect to the chassis or frame of the vehicle. When clutch 220 is engaged, ring gear 216 is fixed and cannot rotate.

Pump 110 is hydraulically connected to motor 112 by hydraulic conduits 222. These conduits conduct fluid to and from motor 112 to form a closed loop hydraulic (hydrostatic) drive circuit.

Motor 112 is coupled to and drives sun gear 224 of planetary gear arrangement 114. Sun gear 224 drives planet gears 226, which drive planetary gear carrier 228.

Gearbox 116 is a multi-speed gearbox having three manually selectable gear ratios with an input shaft 230 and an output shaft coupled to rotor 118. It is shifted using gearshift lever 260.

Input shaft 230 of gearbox 116 is fixed to and rotates together with planetary gear carrier 228. The output shaft of multi-speed gearbox 116 is coupled to and drives rotor 118.

It should be clear that power from engine 104 to rotor 118 follows two parallel paths. The first path is from engine 104, though the gearing, through clutch 214, through planetary gears and into shaft 230. The second parallel path is from engine 104, through pump 110, through motor 112, through sun gear 224, through the planet gear 226 and into shaft 230.

The normal mode of operation, however, is one in which power through both paths is provided to the rotor. Engine 104 operates most efficiently at a set and predetermined rpm, yet the rotor cannot be operated at a set, predetermined speed, but must be variable over some range or ranges of speed to harvest the several types of crops it is intended and designed to do.

To provide this variable rotor speed, the parallel power path through pump 110 and motor 112 to the sun gear is provided. The planetary gear arrangement permits power through both paths to be applied to the rotor. The motor drives the sun gear, the engine drives the ring gear, and the planetary gear carrier receives power from both and applies that combined power to the rotor through gearbox 116.

Electronics

The electronic control system 108, including three digital electronic controllers and their associated sensors, controls the operation of the foregoing machine elements.

The system 108 includes a first digital electronic controller 234, a second digital electronic controller 236 and a third digital electronic controller 238 that are coupled together over a communications network, here shown as a CAN bus 240 in accordance with the SAE J1939 communications standard.

Each controller 234, 236, and 238 are similarly constructed, and include a microprocessor 242, a read-only memory (ROM) 244, a random access memory (RAM) 246 and an input/output (I/O) circuit 248. The ROM stores a control program that controls the operation of the controller. The RAM is temporary storage space for numeric values used in computation, and the I/O circuit handles external communications including communications with the sensors and the other controllers on the CAN bus 240. Each of these circuits is connected using a data/address/control bus of standard design, which is not shown.

The first digital controller 234 is connected to two speed sensors, a rotor speed sensor 252, and a motor speed sensor 254. These sensors are respectively coupled to rotor 118 and motor 112 to sense the rotational speeds of these devices and transmit a signal indicative of those speeds to the first digital controller 234.

The speed sensors in the present system preferably generate a series of pulses as the devices to which they are coupled rotate. The faster the shafts of the engine, rotor and motor turn, the higher the frequency of the stream of pulses arriving at controllers 234 and 236 from the sensors.

Common sensor arrangements that generate such pulse sequences include conditioned alternator signals, Hall effect devices, and inductive pickups that sense the passage of slotted disks or gear teeth mounted on the shafts of the engine, rotor and motor.

The first digital controller 234 is also connected to and controls three other devices: pump 110, engine-to-ring clutch 214 and ring-to-frame clutch 220. Controller 234 generates and transmits a signal indicative of a desired specific displacement to pump 110 over electrical signal lines 209. Pump 110 responsively changes its specific displacement to match the signal. In a similar fashion, controller 234 generates and transmits a clutch-engaging or clutch-disengaging signal to electrical solenoid valves (not shown) that conduct hydraulic fluid to and from the two clutches 214 and 220. The clutches responsively engage and disengage.

The I/O circuit of second digital controller 236 is connected to an engine speed sensor 256 and to operator input device 258. Engine speed sensor 256 generates a signal indicative of the engine speed, typically by generating a pulse train similar to the motor speed sensor. The operator input device is preferably a switch responsive to operator manipulation that generates two separate signals, an "increase speed" signal and a "decrease speed" signal. Controller 236 is also connected to controller 234 and controller 238 via the CAN bus.

The third and final controller, controller 238 is a display controller. It is constructed the same as controller 234 and 236, but is dedicated to displaying data generated by the operator or the other controllers. This capability is provided by an internal control program stored in its ROM memory. It includes a display device such as an LCD or electroluminescent display. It is coupled to the other controllers over CAN bus 240.

Programming

Controllers 234, 236, and 238 include internal digital control programs that control their operation. These programs are stored in the ROM memory of each controller. The programmed operation of each controller is discussed below.

During normal operation, controller 238 displays several data indicative of the vehicle's status. The first of these, the rotor speed, indicates the speed of the rotor. Controller 234 generates the rotor speed data from the rotor speed signal transmitted to controller 234 from rotor speed sensor 252. Controller 234 periodically calculates the rotor speed from the rotor speed signal and places this information on the CAN bus. The rotor speed is preferably calculated and placed on the CAN bus every 10 to 200 milliseconds, preferably at least once every 100 milliseconds, more preferably at least once every 50 milliseconds, and even more preferably at least once every 20 millisecond.

Controller 238 is programmed to receive this rotor speed data over the CAN bus, and to translate them into display signals to drive its integral display. It applies the display signals to the display, thereby generating decimal digits on the display that represent the rotor speed. The display indicates the rotor speed as a sequence of decimal digits expressed in revolutions per minute.

Controller 238 also displays a range of rotor speeds the operator may select. This range is displayed in the form of an upper and a lower limiting rotor speed. These limits are preferably generated by controller 234 and transmitted every 10 to 200 milliseconds over the CAN bus to controller 238, preferably at least once every 100 milliseconds, more preferably at least once every 50 milliseconds, and even more preferably at least once every 20 millisecond.

Controller 238 receives these speed range signals, translates them into display signals to drive its integral display, and applies the signals to the display thereby generating decimal digits on the display that represent the upper and lower rotor speed limit values. These values are preferably expressed in revolutions per minute.

Controller 236 receives the increase-rotor-speed and the decrease-rotor-speed signals (also known as operator speed requests or commands) from operator input device 258 when the operator manipulates the operator input device. Controller 236 transmits these operator requests on the CAN bus.

Controller 234 receives these operator requests and determines whether or not to change the speed of the rotor in response. If it decides that the rotor speed can be changed, it raises or lowers the rotor speed accordingly.

Controller 234 controls the rotor speed by regulating the specific displacement of pump 110. Controller 234 is programmed to execute a conventional PID feedback control loop that uses the commanded rotor speed (from the operator input device) as an input, and the actual rotor speed (from the rotor speed sensor) as the inputs and the signal applied to the pump to control its specific displacement as the output. The difference between these two speeds is the error signal that is minimized by the PID control loop.

Controller 234 changes the commanded rotor speed based on two things: first, a command by the operator using the operator input device to either raise or lower the current commanded speed, and second, controller 234's determination that the rotor can indeed be driven at the speed requested by the operator. If both conditions are met, controller 234 changes the commanded rotor speed and applies it to the input of the PID loop it executes.

Controller 234 also determines whether the motor or the engine (or both) drives the rotor by selectively engaging and disengaging the engine-to-ring clutch and the ring-to-frame clutch. In the discussion below, controller 234 transmits engagement and disengagement signals to the hydraulic valve (not shown) that controls the engine-to-ring clutch, causing it to become engaged (thereby connecting the engine to the ring gear) and disengaged (breaking the engine-to-ring gear drive connection). Controller 234 also transmits engagement and disengagement signals to the hydraulic valve controlling the ring-to-frame clutch, causing it to engage (locking the ring with respect to the chassis or frame) and disengage (releasing the ring).

In the normal operating mode, discussed herein, both the motor and the engine drive the rotor. In this mode, the engine runs at a relatively constant speed of 2150 rpm, which, through the gearing and the engine-to-ring clutch 214 connecting the engine to the ring gear, causes the ring gear to rotate at 2188 rpm.

The motor 112 is designed to be bi-directionally driven by pump 110 over a range of speeds from −4077 rpm to +3114 rpm. Given the gear ratios of the planetary gear arrangement, these speeds cause planetary gear carrier 228 to rotate at speeds ranging from 1144 to 2342 rpm.

In the normal or hydro-mechanical mode, the rotor can be driven at an infinite number of speeds in either direction since the motor has a limited range of operating speeds, the engine operates at a relatively fixed speed, and gearbox 116 has a predetermined set of gear ratios. By "gear ratio" we means the ratio of gearbox input shaft speed versus gearbox output shaft speed. Given these constraints, for any selected gear ratio of gearbox 116, there is an associated and predetermined range of permissible rotor speeds. These speeds are expressed as a rotor speed upper limit and a rotor speed lower limit. Again, each of the selectable gear ratios of gearbox 116 has an associated and different rotor speed upper and lower limit.

The input shaft 230 of gearbox 116 is connected to and driven by the planetary gear carrier 228. The gearbox has three different selectable gear ratios—ratios of gearbox input shaft to output shaft speeds. These gear ratios are selectable by manual operator manipulation of a conventional gearshift lever 260.

Given the gear ratio of the planetary gear arrangement, input shaft 230 of gearbox 116 rotates at speeds of between 1144 and 2342 rpm; at 1144 rpm, the motor is rotating at −4077 rpm. At 2342 rpm, the motor is rotating at 3114 rpm.

The highest gearbox gear ratio rotates the output shaft of the gearbox (and the rotor to which it is coupled) at a speed of between 589 and 1206 rpm. For the middle gear ratio, this speed is between 391 and 800 rpm. For the lowest gear ratio, this speed is between 222 and 454 rpm. The output shaft speed varies with the motor speed.

When the motor rotates at −4077 rpm (and, again, assuming an engine speed of 2150 rpm), the rotor rotates at 589, 391, or 222 rpm, depending upon the gearbox 116 gear ratio. When the motor rotates at +3114 rpm, the rotor rotates at 1206, 800, or 454 rpm, depending upon the gear ratio.

Controller 234 achieves intermediate speeds within these rotor speed ranges by varying the motor speed from −4077 to +3114 rpm. Controller 234 does this by controlling the specific displacement of pump 110 in the PID control loop.

The operator is interested in controlling the rotor speed, since the rotor speed determines the rate at which the combine performs its work. It is for this reason that controller 234 is configured to transmit the rotor speed on the CAN bus to controller 238 to be displayed.

The operator can select any rotor speed, but the ranges of permissible rotor speeds are limited based upon the selected gear ratio of gearbox 116. Each gearbox gear ratio has its own associated range of rotor speeds. As a result, the operator is also interested in knowing the range of rotor speeds that he can select. It is for this reason that controller 234 transmits the upper and lower rotor speed limits (which depend upon the currently selected gearbox gear ratio) on the CAN bus to controller 238 to be displayed.

Dynamic System Model

Planetary gear set 114 and gearbox 116 are modeled as a dynamic system having three inputs and a single output. The inputs are (a) motor speed, (b) the output shaft (or rotor) speed, and (c) ring gear speed. The physical output is the selected gear ratio.

The relationship between these measurable inputs and outputs are expressed in the following Equations 1–3. There are three equations since there are three different operator selectable gear ratios, in addition to neutral.

$$RS=K1*(KX*RGS+KY*MS) \qquad \text{Eqn. 1}$$

$$RS=K2*(KX*RGS+KY*MS) \qquad \text{Eqn. 2}$$

$$RS=K3*(KX*RGS+KY*MS) \qquad \text{Eqn. 3}$$

RS is the rotor speed. RGS is the ring gear speed. MS is the motor speed. K1, K2 and K3 are constants corresponding to the high, medium and low gear ratios, respectively, provided by gearbox 116. KX and KY are constants corresponding to the mathematical model of the planetary gear arrangement.

These three equations can be summarized as follows:

$$RS=KGR*(KX*RGS+KY*MS) \qquad \text{Eqn. 3a}$$

where KGR is the gear ratio of the gearbox. KGR will equal either K1, K2 or K3 depending upon the gearbox's selected gear ratio.

Equations 1–3 are one expression of the mathematical dynamic system model of the drive system expressed in a rather condensed form. The details of the model can be seen in the sub-equations that model each sub-component of the drive system, which are described below.

The engine to ring gear drive train model is as follows:

When the engine-to-ring clutch 214 is engaged and the ring-to-frame clutch 220 is disengaged:

$$RGS=ES*KZ \qquad \text{Eqn. 4}$$

RGS is ring gear speed, ES is engine speed, and KZ is constant equal (in this embodiment) to 2188 rpm/2150 rpm or 1.017. When the engine-to-ring clutch is disengaged and the ring-to-frame clutch is engaged:

$$RGS=0 \qquad \text{Eqn. 4a.}$$

The motor to planetary gear arrangement model is as follows:

$$MS=SGS \qquad \text{Eqn. 5}$$

MS is motor speed. SGS is sun gear speed. This relation indicates that the motor and the sun gear turn at the same speed, since the sun gear is fixed to the motor shaft.

The planetary gear arrangement model is as follows:

$$PSS=KX*RGS+KY*SGS \qquad \text{Eqn. 6}$$

PSS is the planetary spider speed. RGS is the ring gear speed. SGS is the sun gear speed. KX and KY are constants defined by the geometry of the planetary gear arrangement—by the number of teeth on the planetary gears. KX in this embodiment is 5/6 KY in this embodiment is −1/6.

The planetary to gearbox model is as follows.

$$GIS=PSS \qquad \text{Eqn. 7}$$

GIS is the gearbox input shaft speed. PSS is the planetary spider speed. This is true since the gearbox input shaft is fixed to the planetary gear spider.

The gearbox to rotor model is as follows:

$$RS=K1*GIS \qquad \text{Eqn. 8}$$

$$RS=K2*GIS \qquad \text{Eqn. 9}$$

$$RS=K3*GIS \qquad \text{Eqn. 10}$$

RS is rotor speed. K1, K2, and K3 are three constants corresponding to the high, medium and low gear ratios of the gearbox 116 and equal 0.51, 0.34 and 0.19, respectively. There are three equations since there are three different selectable gear ratios in gearbox 116.

To estimate the gear ratio in the preferred embodiment, controller 234 is preferably provided with the foregoing Equations 4–10, reduced to Equations 1–3, which are programmed into the electronic memory of controller 234. They are preferably expressed as infinitesimals, differentials, or tabular form for quick calculation during operation of controller 234. While this is the preferred system model of the present embodiment, it should be obvious that other equations can be added to accommodate and represent a variety of other interactions as necessary. This would result in more complex system models and hence more calculations by controller 234, but would have the advantage of more closely representing the physical system.

Estimation of Gear Ratio

Controller 234 must know or otherwise determine the gear ratio of gearbox 116 in order to determine the acceptable range of rotor speeds and hence the rotor speeds to be displayed by controller 238. The discussion below explains how the gear ratios (as an example of one system parameter) are estimated and how controller 234 calculates the limiting rotor speeds for display.

Again, controller 234 uses the acceptable range of rotor speeds in two ways: (a) it sends those speeds to the display of controller 238 and (2) it compares the operator commands provided by the operator input device with the current commanded rotor speed to determine whether the commanded rotor speed can be raised or lowered in response to the operator's request.

In order to determine the appropriate rotor speed limits to use, the gear ratio could be directly determined if any controller in the system was coupled to a gearbox sensor to indicate the gear ratio directly, such as by sensing the orientation of the gears within gearbox 116, or the position of the gearshift lever 260 of gearbox 116.

This would, however, require the use of a sensor to detect those physical parameters. The present system avoids the requirement of a separate gearbox 116 sensor by estimating the gear ratio using three other measured physical system parameters: the motor speed, the engine speed and the rotor speed. Controller 234 inputs these three speeds into the dynamic model (Eqn. 3a) of the drive system stored in the ROM memory of controller 234 and estimates the actual gear ratio.

To do this, controller 234 measures the motor speed and the rotor speed using the motor and rotor speed sensors. These values are preferably measured every 10 milliseconds. Controller 236 preferably measures the engine speed every 10 milliseconds using its engine speed sensor and sends this to controller 234.

Once controller 234 receives the three speed signals it calculates the gear ratio KGR. This value will be roughly equivalent to K1, K2 or K3, and will depend upon which of the three gear ratios is currently selected. Controller 234 then compares the calculated actual ratio with the values K1, K2 and K3.

If the calculated KGR equals (or alternatively comes within a predetermined range of) K1, controller 234 estimates that gearbox 116 is in the high gear ratio, it fetches the high gear ratio upper and lower rotor speed limits from its memory and it transmits these values to controller 238 for display.

If the calculated KGR equals (or alternatively comes within a predetermined range of) K2, controller 234 estimates that gearbox 116 is in the middle or medium gear ratio, it fetches the middle gear ratio upper and lower rotor speed limits from its memory and it transmits these values to controller 238 for display.

If the calculated KGR equals (or alternatively comes within a predetermined range of) K3, controller 234 estimates that gearbox 116 is in the low gear ratio, it fetches the low gear ratio upper and lower rotor speed limits from its memory and it transmits these values to controller 238 for display.

Furthermore, controller 234 keeps the two selected limits in memory locations in RAM memory in order to process the operator requests or commands to change the rotor speed that are received from the operator input device 258.

Whenever controller 234 receives a command to raise or lower the commanded rotor speed from the operator input device (which is received by controller 236 and transmitted from controller 236 over the CAN bus) it first checks to see whether the rotor speed can be changed as the operator requested.

If the request is an "increase speed" signal, controller 234 compares the current commanded rotor speed with the upper rotor speed limit. If the upper rotor speed limit is greater than the current commanded speed, controller 234 raises the command rotor speed by a predetermined number of revolutions per minute, preferably ten (10) rpm. Controller 234 then replaces the existing commanded rotor speed used in the PID feedback control loop with the new (and higher) rotor speed. Alternatively, if the current commanded rotor speed is equal to the upper speed limit, the rotor speed cannot be increased and controller 234 ignores the "increase speed" request.

If the request is a "decrease speed" signal, controller 234 compares the current commanded rotor speed with the lower rotor speed limit. If the lower rotor speed limit is less than the current commanded speed, controller 234 lowers the command rotor speed by a predetermined number of revolutions per minute, preferably ten (10) rpm.

Controller 234 then replaces the existing commanded rotor speed used in the feedback control algorithm with the new (and lower) commanded rotor speed. Alternatively, if the current commanded rotor speed is equal to the lower speed limit, the rotor speed cannot be decreased and controller 234 ignores the "decrease speed" request.

Figure 3:
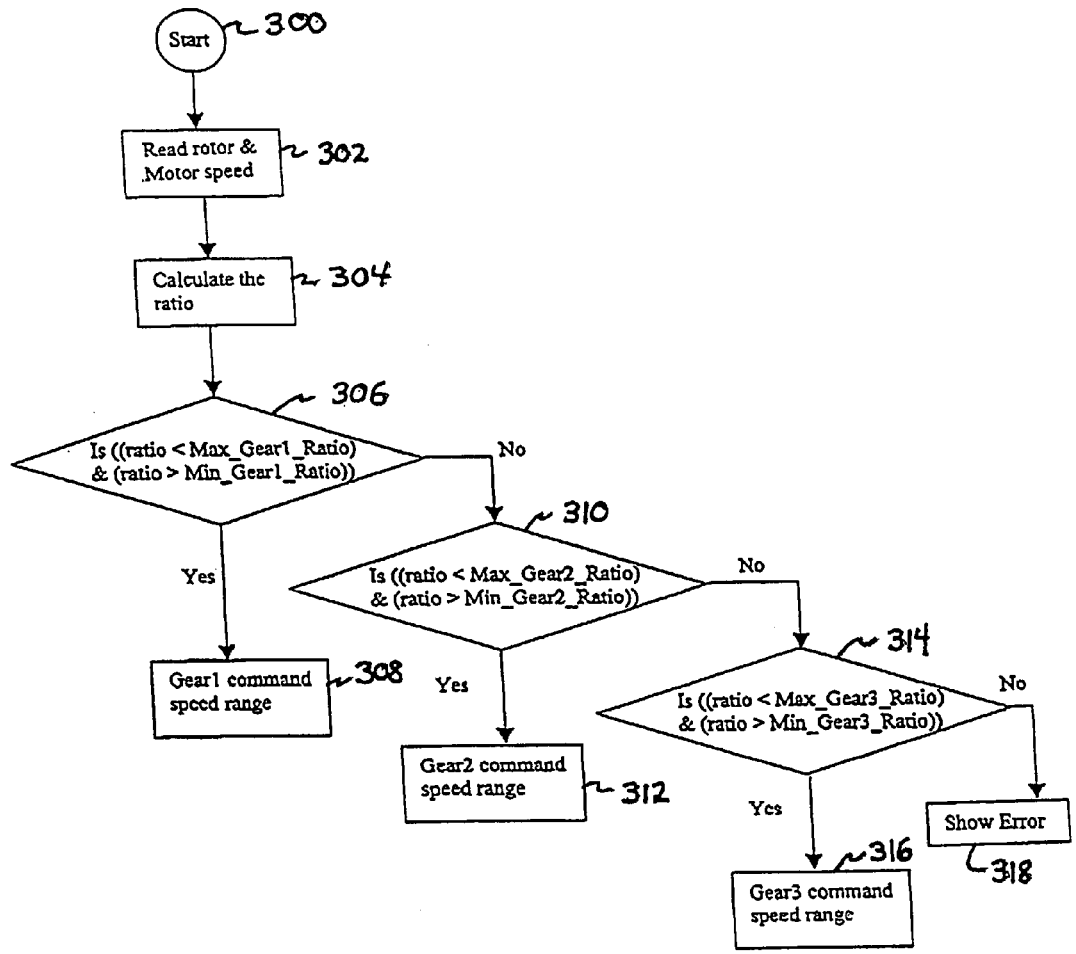
FIG. 3 is a flow chart showing the programmed operation of the electronic controllers of FIG. 2 in estimating the system parameter and in controlling the operation of the system in response to the magnitude of that estimated value.

A preferred process of checking the actual speed ratio can be seen in FIG. 3, which illustrates in flow chart form a preferred embodiment of the control program executed by controller 234 to check the actual speed ratio.

In step 300 of FIG. 3, the process of estimating the gear ratio starts. In step 302, controller 234 fetches the motor and rotor speeds from the motor and rotor speed sensors. In step 304, controller 234 inserts the sensor values into equation 3a and solves for KGR. Since the ring-to-frame clutch is engaged, the ring gear speed (RGS) is zero during gear ratio determination.

In step 306, controller 234 compares the calculated actual ratio with a range of value between Max_Gear1_Ratio and Min_Gear1_Ratio. These values define a range of values around K1, with K1 preferably in the middle of the range. If the ratio falls within this range, controller 234 determines that the gear ratio of the gearbox is the first of the three selectable gear ratios and exits the estimation routine at block 308. If controller 234 does not determine that the ratio is within this range, processing continues to step 310.

In step 310, controller 234 compares the calculated actual ratio with a range of value between Max_Gear2_Ratio and Min_Gear2_Ratio. These values define a range of values around K2 with K2 preferably in the middle of the range. If the ratio falls within this range, controller 234 determines that the gear ratio of the gearbox is the second of the three selectable gear ratios and exits the estimation routine at block 312. If controller 234 does not determine that the ratio is within this range, processing continues to step 314.

In step 314, controller 234 compares the calculated actual ratio with a range of value between Max_Gear3_Ratio and Min_Gear3_Ratio. These values define a range of values around K3 with K3 preferably in the middle of the range. If the ratio falls within this range, controller 234 determines that the gear ratio of the gearbox is the third of the three selectable gear ratios and exits the estimation routine at block 316. If controller 234 does not determine that the ratio is within this range, processing continues to block 318.

In block 318, controller 234 transmits an error message to the operator that is displayed on the display of controller 238 indicating that controller 234 was unable to determine the gear ratio of the gearbox.

In a perfect system, the calculated ratio, KGR, based upon the speed sensor signals would be exactly equal to K1, K2 or K3 which are based on the geometry of the gearbox. The speed sensors generate a finite number of pulses for each revolution, however, and therefore the calculated KGR based on the sensor values may not exactly equal K1, K2 or K3.

For this reason, the calculated ratio derived from the speed sensor data is compared with a limited range of values surrounding each gear ratio. These ranges are expressed as the "Max. . . . " and "Min . . . " values shown in FIG. 3 and described above.

From the discussion above, it should be clear that the display associated with controller 238 is continually updated to show the permissible range of rotor speeds, expressed as an upper speed limit and a lower speed limit. The display is also continuously updated to show the actual rotor speed. The system also estimates a system parameter (in this example the position of the gears in gearbox 116, the gear ratio of the gearbox or the position of the gearshift lever in the gearbox) by applying one or more (and in this case three) measured variables to a mathematical model of the drive system that is stored in the memory of controller 234, solving for the parameter in the mathematical model, thereby estimating the value of the system parameter.

Ring Gear Speed Estimation During Clutch Engagement

During initial startup of the rotor, controller 234 engages the ring-to-frame clutch and disengages the engine-to-ring clutch. This engages the motor to the rotor and disengages the engine from the rotor.

With the engine-to-ring clutch disengaged, the engine runs at its default constant speed of about 2150 rpm driving the (disconnected) engine side of the engine-to-ring clutch at about 2188 rpm, as well as the input shaft to the pump. The pump, at this point, is unloaded; the specific displacement of the pump is zero gallons per minute (gpm).

At this point, neither the rotor nor the motor is rotating. Since the ring-to-frame clutch is engaged, however, the ring gear is held stationary and the motor is therefore rotationally coupled to the rotor.

Controller 234 then signals the pump to increase its specific displacement. As the displacement increases, the motor begins rotating and, in turn, begins rotating the rotor. The specific displacement is increased to a predetermined level corresponding to a predetermined conditional threshold based on motor speed, rotor speed, and/or time.

Once the motor and rotor have reached this predetermined conditional threshold, controller 234 then disengages the ring-to-frame clutch. With the ring-to-frame clutch disengaged, the rotor immediately begins slowing down, since it is not longer drivingly coupled to the motor. The ring, which has a rotational velocity of zero at the instant the ring-to-frame clutch is disengaged, begins to accelerate.

The reason the ring-to-frame clutch is disengaged, however, is to permit the engine to be drivingly coupled to the rotor, and to perform that coupling with the least wear on the engine-to-ring clutch as possible. To do this, controller 234 estimates the ring gear speed as a function of the current gearbox 116 ratio, the motor speed and the rotor speed. There is a predetermined relationship between these parameters, as indicated by the drive equations shown above, which are derived from the geometry of the drive train.

Controller 234 estimates the ring gear speed in order to minimize the speed difference between the two sides (the input/engine side and the output/ring side) of the engine-to-ring clutch before controller 234 engages the engine-to-ring clutch. By minimizing the speed difference, the impact and wear on the engine-to-ring clutch elements can be significantly reduced when the engine-to-ring clutch is engaged.

To minimize the speed difference, controller 234 executes a PID feedback control loop that controls motor speed based upon the ring speed. The target ring speed (i.e. the speed to which the PID control loop drives the ring gear) is the actual speed of the engine side of the engine-to-ring clutch, which speed is a function of measured engine speed (see drive system equations, above). The actual ring gear speed (the driven speed) is estimated using the drive system equations above, and is based upon the motor speed, the gearbox ratio, and the rotor speed provided by the motor and rotor speed sensors. The rotor speed is not controlled during the speed matching, merely monitored, since it is partially disconnected from both the motor and the engine.

Controller 234 drives the motor in the feedback control loop until the difference between the estimated ring gear speed (the speed of the output side of the engine-to-ring clutch) and the target speed (the speed of the input side of the engine-to-ring clutch) is reduced to reach a predetermined minimum value. This value is preferably zero rpm speed difference, although it may be lesser or greater than zero.

Once controller 234 has driven the output side of the engine to ring clutch to the proper speed, it then engages the engine-to-ring clutch. This engagement couples the engine to the planetary gear arrangement in addition to the motor, which is coupled to the sun gear.

In this mode, both the engine (running at a generally constant speed) and the motor, which is driven by controller 234 at a varying speed as commanded by the operator using the operator input device 258 (see the section above on estimating the gear ratio), will drive the rotor.

It should be clear that in the speed matching process the system estimates a physical parameter of the system based upon an internal mathematical model of the dynamic system and uses this estimated physical parameter in a feedback control loop to control another physical parameter. In the ring gear speed-matching example, controller 234 uses the ring gear speed (when the ring-to-frame clutch is engaged), the motor speed and the rotor speed to estimate the gear ratio of the gearbox. Knowing the gear ratio, controller 234 estimates the ring gear speed for all other states of the clutches 214, 220. Controller 234 applies the ring gear speed and the gear ratio to a conventional feedback control loop to regulate the current applied to the pump, thereby controlling the pump output and the motor speed to drive the ring gear such that it reduces the speed difference between the engine-to-ring clutch input and output.

Figure 4:
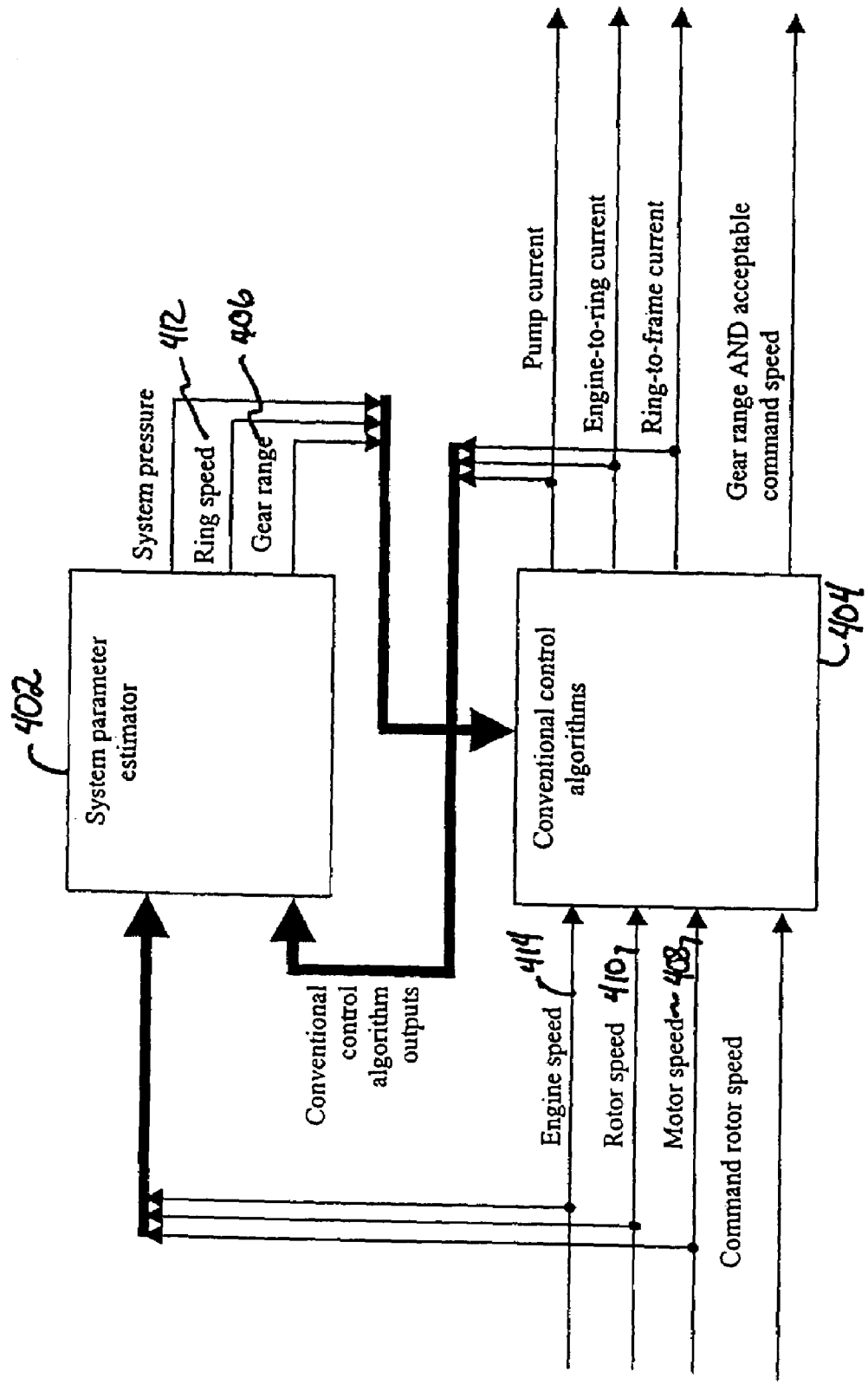
FIG. 4 is a top level system diagram of the estimation and control functions performed by the electronic controllers of the combine in estimating physical parameters of the combine drive system and using those estimated parameters in a PID feedback control loop.

The above process is shown schematically in FIG. 4, which models the estimation and feedback control processes.

On the left hand side of FIG. 4, the engine speed, rotor speed and the motor speed are received by controller 234 as inputs. These inputs are provided to both a system estimating portion 402 of the control program of controller 234 and to a conventional control algorithm portion 404 of the control program of controller 234.

The system estimating portion 402 of the control program of controller 234 estimates the gear ratio or gear range 406 (based upon the motor speed 408 and the rotor speed 410) and the ring gear speed 412 (based on the motor speed 408, the rotor speed 410, the engine speed 414, and the previously estimated gear ratio 406). It does this by fitting the speeds and gear ratio to the drive system equations that comprise the mathematical model of the drive system and subcomponents thereof.

In the example above of the ring gear speed estimation, it is the system estimating portion 402 that estimates the ring gear speed.

The estimated values of ring gear speed and gear ratio are provided to the conventional control algorithm portion 404 together with the engine, motor and rotor speeds to control a second physical parameter.

In the example above of gear ratio estimation, the conventional control algorithm portion 404 includes that portion of the control program of controller 234 that receives the estimated gear ratio, determines the acceptable range of rotor speeds, and prevents the operator from changing the rotor speed if it is outside the permissible range of rotor speeds.

In the example above of ring gear speed estimation, the conventional control algorithm portion 404 includes the control portion of the control program of controller 234, which receives the estimated ring gear speed (which is also the speed of the output side of the engine-to-ring clutch), compares it with the speed of the input side of the engine-to-ring clutch and minimizes the difference in speeds until the speed difference is sufficiently small, and then engages the engine-to-ring clutch.

It will be obvious to those skilled in the art that various changes may be made without departing from the scope of the invention and the invention is not considered to be limited to what is illustrated in the drawings and described in the specification.

What is claimed is:

1. A control system for controlling the speed of a ring gear in a planetary gear arrangement of a work vehicle when the speed of the ring gear is not known or calculated, the arrangement being coupled to a hydraulic motor, and the ring gear being couplable to an internal combustion engine to be driven thereby, the system including:
   a. an electronic controller including a digital microprocessor and an electronic digital memory, the controller being configured to regulate a speed of the ring gear in accordance with a dynamic system model by controlling the speed of the hydraulic motor wherein the memory includes a sequence of preprogrammed instructions including the dynamic system model expressed at least in terms of a rotational speed, and the dynamic system model is operated in real time during operation of the arrangement to estimate the speed of the ring gear; and
   b. at least one sensor coupled to the electronic controller to generate a first signal indicative of the rotational speed and to provide the first signal to the electronic controller, wherein the electronic controller is further configured to receive the first signal input and apply the first signal input to the dynamic system model to responsively control the speed of the planetary ring gear.

2. The control system of claim 1, wherein the rotational speed is a rotational speed of the motor, and further wherein the at least one sensor is operable to indicate the rotational speed of the motor.

3. The control system of claim 2, wherein the electronic controller is configured to estimate a rotational speed of the ring gear based at least upon the rotational speed of the hydraulic motor.

4. The control system of claim 3, further comprising a second speed sensor coupled to the internal combustion engine to produce a second signal indicative of a rotational speed of the internal combustion engine, and further wherein the electronic controller is configured to estimate a rotational speed of the ring gear based at least upon the signal from the second speed sensor.

5. The control system of claim 4, wherein the controller calculates a difference between the rotational speed of the ring gear and the rotational speed of the engine based at least upon the signal from the second speed sensor and the rotational speed of the ring gear.

6. The control system of claim 5, wherein the controller changes the rotational speed of the hydraulic motor until the difference is below a predetermined value.

7. The control system of claim 6, wherein when the difference is below the predetermined value, the controller causes the engine to couple with the planetary gear arrangement simultaneous with the motor being coupled with the planetary gear arrangement.

* * * * *